(12) United States Patent
Yoshida

(10) Patent No.: US 8,482,591 B2
(45) Date of Patent: Jul. 9, 2013

(54) IMAGE FORMING APPARATUS FOR FORMING LATENT IMAGE ON A PHOTOSENSITIVE MEMBER

(75) Inventor: Hidefumi Yoshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 12/903,978

(22) Filed: Oct. 13, 2010

(65) Prior Publication Data

US 2011/0122215 A1  May 26, 2011

(30) Foreign Application Priority Data

Nov. 20, 2009  (JP) ................................. 2009-265235

(51) Int. Cl.
*B41J 2/47* (2006.01)
*H04N 1/40* (2006.01)

(52) U.S. Cl.
USPC .......................................... 347/254; 358/3.23

(58) Field of Classification Search
USPC .................. 347/131, 240, 251–254; 358/443, 358/448, 465, 456, 466, 3.06–3.1, 3.13–3.23
See application file for complete search history.

(56) References Cited

U.S. PATENT DOCUMENTS

| 5,673,116 | A  | * | 9/1997  | Fukushima | ................... | 358/3.08 |
| 6,130,966 | A  | * | 10/2000 | Sekine et al. | .................. | 382/299 |
| 6,538,771 | B1 | * | 3/2003  | Sakatani et al. | ............... | 358/2.1 |
| 6,856,438 | B2 | * | 2/2005  | Takanashi et al. | .......... | 359/204.1 |
| 7,511,856 | B2 | * | 3/2009  | Inoue et al. | ................... | 358/3.13 |

FOREIGN PATENT DOCUMENTS

| JP | 3-200917 A   | 9/1991 |
| JP | 2001-341356 A | 12/2001 |

* cited by examiner

*Primary Examiner* — Hai C Pham
(74) *Attorney, Agent, or Firm* — Canon U.S.A., Inc. IP Division

(57) ABSTRACT

An apparatus includes a plurality of light-emitting sources configured to irradiate a photosensitive member in a sub scanning direction with a plurality of light beams scanned in a main scanning direction of the photosensitive member via an optical system, a conversion unit configured to convert image data into pixel data constituting a pattern that expresses a density with a plurality of pixels, and a drive unit configured to cause the plurality of light-emitting sources to emit light based on the converted pixel data, wherein, where a number of light-emitting sources is B and a number of pixels of the pattern in the sub scanning direction is M, the number B and the number M have a relationship such that the number M is not divisible by the number B or the number B is not divisible by the number N.

8 Claims, 15 Drawing Sheets

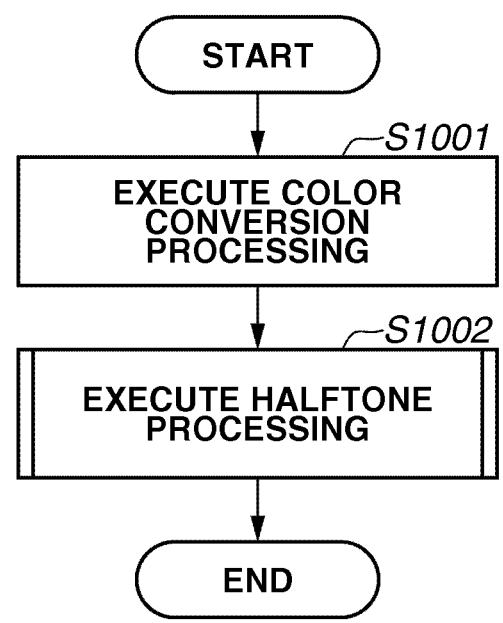

FIG.6A

| 13 | 9 | 5 | 7 | 14 |
|----|---|---|---|----|
| 9  | 3 | 2 | 4 | 10 |
| 7  | 1 | 1 | 2 | 6  |
| 12 | 5 | 3 | 4 | 8  |
| 15 | 8 | 6 | 11| 15 |

FIG.6B

| 13 | 9 | 5 | 7 | 14 | 13 | 9 | 5 | 7 | 14 |
|----|---|---|---|----|----|---|---|---|----|
| 9  | 3 | 2 | 4 | 10 | 9  | 3 | 2 | 4 | 10 |
| 7  | 1 | 1 | 2 | 6  | 7  | 1 | 1 | 2 | 6  |
| 12 | 5 | 3 | 4 | 8  | 12 | 5 | 3 | 4 | 8  |
| 15 | 8 | 6 | 11| 15 | 15 | 8 | 6 | 11| 15 |
| 13 | 9 | 5 | 7 | 14 | 13 | 9 | 5 | 7 | 14 |
| 9  | 3 | 2 | 4 | 10 | 9  | 3 | 2 | 4 | 10 |
| 7  | 1 | 1 | 2 | 6  | 7  | 1 | 1 | 2 | 6  |
| 12 | 5 | 3 | 4 | 8  | 12 | 5 | 3 | 4 | 8  |
| 15 | 8 | 6 | 11| 15 | 15 | 8 | 6 | 11| 15 |

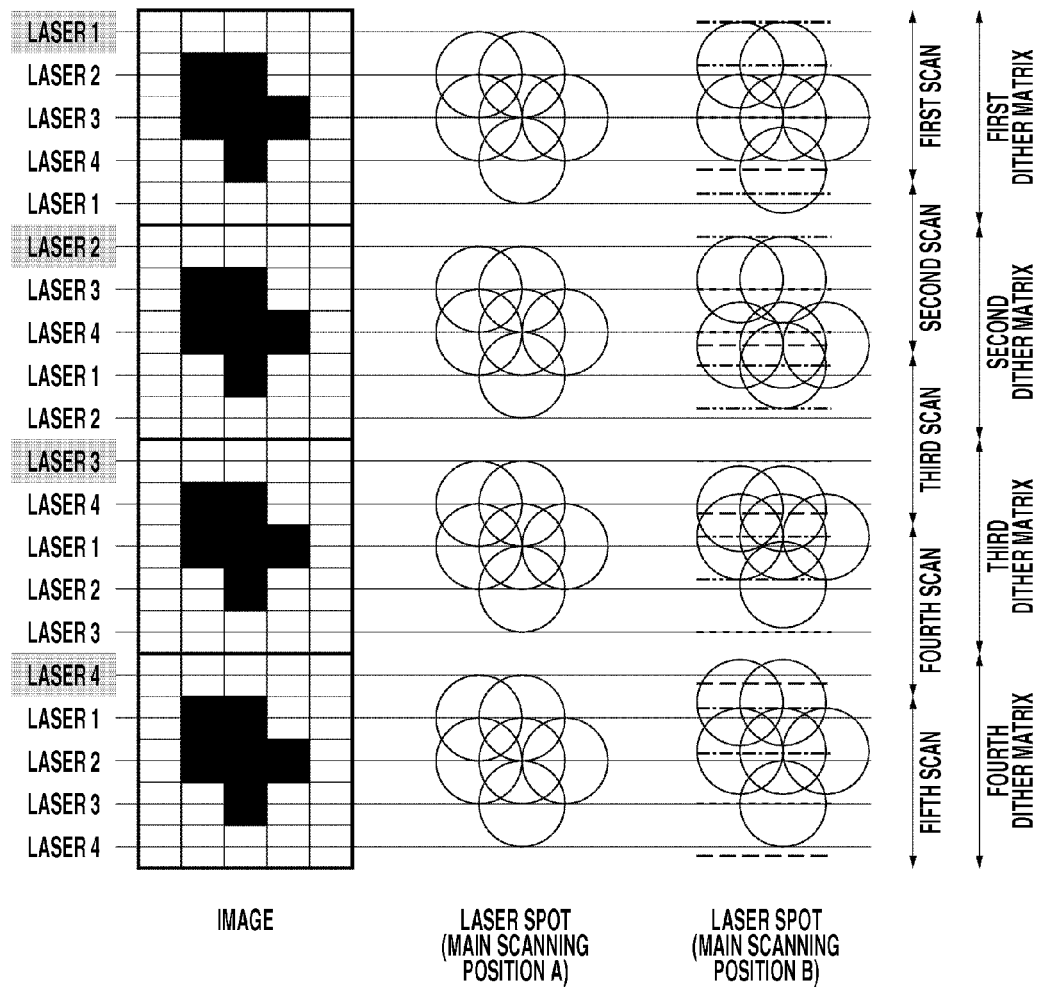

FIG.8

| | PATTERN 1 | PATTERN 2 | PATTERN 3 | PATTERN 4 |
|---|---|---|---|---|
| LASER NUMBER TO SCAN FIRST LINE OF DITHER MATRIX | 1 | 2 | 3 | 4 |
| LASER NUMBER TO SCAN SECOND LINE OF DITHER MATRIX | 2 | 3 | 4 | 1 |
| LASER NUMBER TO SCAN THIRD LINE OF DITHER MATRIX | 3 | 4 | 1 | 2 |
| LASER NUMBER TO SCAN FOURTH LINE OF DITHER MATRIX | 4 | 1 | 2 | 3 |
| LASER NUMBER TO SCAN FIFTH LINE OF DITHER MATRIX | 1 | 2 | 3 | 4 |

FIG.11

| 14 | 10 | 9 | 11 | 15 |
|----|----|---|----|----|
| 12 | 6  | 2 | 5  | 13 |
| 8  | 3  | 1 | 4  | 7  |
| 12 | 6  | 2 | 5  | 13 |
| 14 | 10 | 9 | 11 | 15 |

IMAGE

LASER SPOT
(MAIN SCANNING
POSITION A)

LASER SPOT
(MAIN SCANNING
POSITION B)

FIG.13A
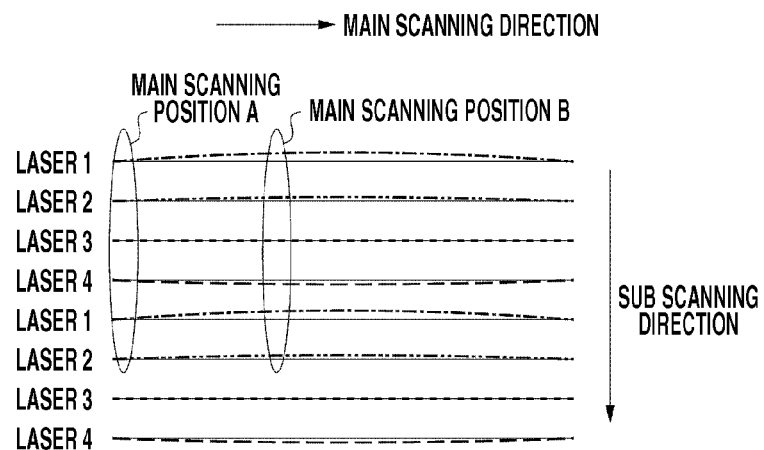
FIG.13B
FIG.13C
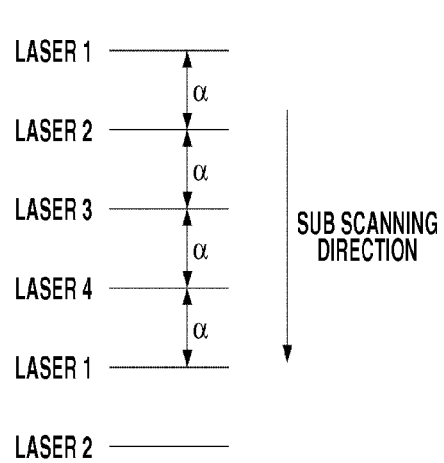
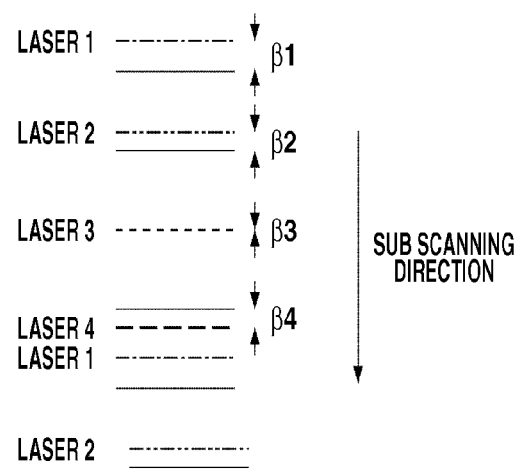

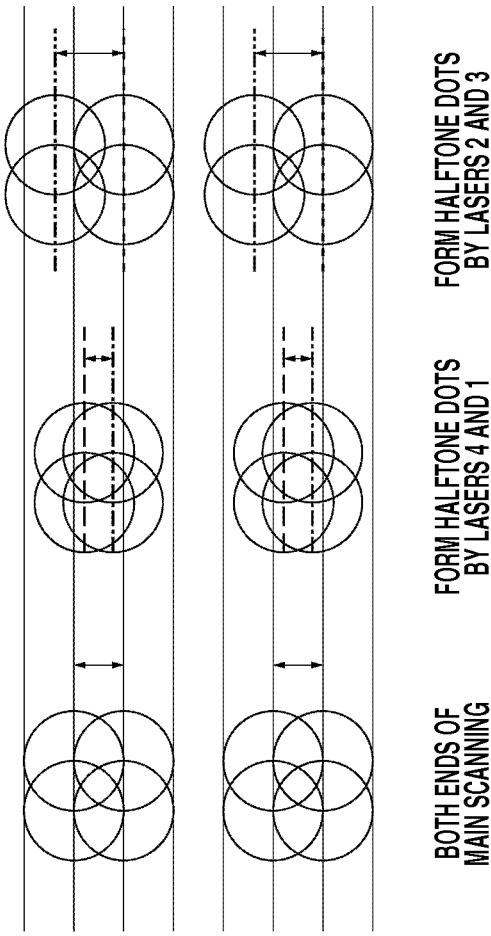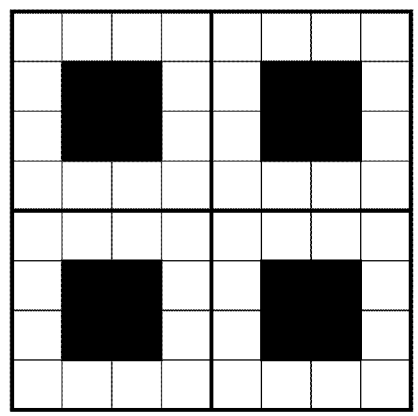

IDEAL

HALFTONE DOT IS SMALL
IN THE VICINITY OF CENTER

HALFTONE DOT IS LARGE
IN THE VICINITY OF CENTER

IMAGE FORMING APPARATUS FOR FORMING LATENT IMAGE ON A PHOTOSENSITIVE MEMBER

BACKGROUND OF THE INVENTION

1. Field of the Invention

The present invention relates to an image forming apparatus. More particularly, the present invention relates an image forming apparatus that irradiates a photosensitive member with light corresponding to image data, and forms a latent image on a photosensitive member.

2. Description of the Related Art

In an image forming apparatus, such as an electrophotographic copying machine or a laser beam printer, using a laser beam, scanning lines for a plurality of lines can be drawn with a plurality of laser light-emitting sources for high-speed and high-resolution printing, as discussed in Japanese Patent Application Laid-Open No. 03-200917.

However, since optical paths of respective laser light beams differ, positions where respective laser light beam pass through an optical system also differ, so that curves or inclinations different depending on lasers may occur on scanning lines. In this case, an interval (pitch) of the scanning lines drawn by lasers may vary depending on the main scanning position. If the pitch of the scanning lines is not uniform, unevenness in density may occur on a screen image which is uniform in density inside one page, at the background, or in the predetermined region.

This issue will be described in detail. FIG. 13A illustrates scanning lines caused by respective lasers when scanning lines for four lines are simultaneously drawn by four laser light-emitting sources. The solid line indicates an ideal scanning line. The dashed-dotted line indicates a scanning line by laser 1. The dashed-two dotted line indicates a scanning line by laser 2. The dotted line indicates a scanning line by laser 3. The broken line indicates a scanning line by laser 4. In FIG. 13A, the scanning lines by laser 1 and laser 2 are curved convex upward, the scanning line by laser 3 is not curved, and the scanning line by laser 4 is curved convex downward. As can be seen from FIG. 13A, the pitch of the ideal scanning lines is fixed irrespective of the main scanning position. On the other hand, the pitch of the actual scanning lines in the sub scanning direction differs depending on the main scanning position.

FIG. 13B is an enlarged view of scanning lines in a main scanning position A in FIG. 13A. In the main scanning position A, which is the left end of main scanning, the actual scanning line is present on an ideal scanning line. The scanning lines (solid lines) are drawn at an ideal pitch α. FIG. 13C is an enlarged view of scanning lines in a main scanning position B in FIG. 13A. In the main scanning position B, which is in the vicinity of the center of main scanning, the actual scanning lines (dashed-dotted lines, dashed-two dotted lines, dotted lines, and broken lines) deviate from the ideal scanning lines. The actual scanning lines deviate by distances β1, β2, β3, and β4, respectively, from the ideal scanning lines.

A case where a screen image is formed by such scanning lines that are non-uniform in pitch in the sub scanning direction will be described. FIG. 14A illustrates a halftone dot image obtained by expressing a multilevel halftone image with binary values by screen processing. This screen processing is executed by using a dither filter of 4 by 4 pixels. Among 4 by 4 pixels of the dither filter, central 2 by 2 pixels are portions where a laser spot is formed by laser light. In FIGS. 14B to 14D, the solid line indicates an ideal scanning line, the dashed-dotted line indicates a scanning line drawn by laser 1, the dashed-two dotted line indicates a scanning line drawn by laser 2, the dotted line indicates a scanning line drawn by laser 3, and the broken line indicates a scanning line drawn by laser 4. FIG. 14B illustrates laser spots for every halftone dot at the end part of main scanning formed during scanning by laser 1 and laser 2 (or laser 2 and laser 3, laser 3 and laser 4, or laser 4 and laser 1). At the end part of main scanning, all lasers can execute scanning at an ideal pitch. Thus, a halftone dot can be formed.

FIG. 14C illustrates laser spots for every halftone dot in the vicinity of the center of main scanning formed during scanning by laser 4 and laser 1. In the vicinity of the center of main scanning, since the scanning line by laser 4 is curved convex downward, a laser spot is formed below the ideal scanning position. Since the scanning line by laser 1 is curved convex upward, a laser spot is formed above the ideal scanning position. Accordingly, compared with a case in which the scanning line is formed on the ideal scanning line, the halftone dot is reduced in the sub scanning direction. Since the number of laser light-emitting sources is four and the vertical size of the dither filter is four pixels, in this case, central 2 by 2 pixels among 4 by 4 pixels of the dither filter are formed by the same laser light-emitting sources (e.g., laser 4 and laser 1). Accordingly, the size of a halftone dot at the center part of main scanning becomes smaller than that at the end part of main scanning throughout the area in the sub scanning direction. Thus, as illustrated in FIG. 15A, the density is expected to be uniform at the entire area. However, as illustrated in FIG. 15B, the density at the center part of main scanning becomes thinner than that at the end part of main scanning.

On the other hand, as illustrated in FIG. 14D, when a half tone dot is formed by laser 2 and laser 3, in the vicinity of the center of main scanning, the scanning line by laser 2 is curved convex upward and the scanning line by laser 3 is not curved. Thus, compared with that when the scanning line is formed on the ideal scanning line, a halftone dot is enlarged in the sub scanning direction. Accordingly, the size of a halftone dot at the center part of main scanning becomes larger than that at the end part of main scanning throughout the area in the sub scanning direction. Thus, as illustrated in FIG. 15A, the density is expected to uniform at the entire area. However, as illustrated in FIG. 15C, the density at the center part of main scanning becomes thicker than that at the end part of main scanning.

SUMMARY OF THE INVENTION

According to an aspect of the present invention, an apparatus for scanning light corresponding to pixel data in a main scanning direction, developing a latent image formed on the photosensitive member on which the scanned light is irradiated light, and transferring the developed image onto a recording sheet includes a plurality of light-emitting sources configured to irradiate the photosensitive member in a sub scanning direction with a plurality of light beams scanned in the main scanning direction of the photosensitive member via an optical system, a conversion unit configured to convert image data into pixel data constituting a pattern that expresses a density with a plurality of pixels, and a drive unit configured to cause the plurality of light-emitting sources to emit light based on the converted pixel data, wherein, where a number of light-emitting sources is B and a number of pixels of the pattern in the sub scanning direction is M, the number B and the number M have a relationship such that the number M is not divisible by the number B; and wherein the pattern is line symmetric relative to a center of the pattern in the sub scanning direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating image processing according to an exemplary embodiment of the present invention.

FIGS. 6A and 6B illustrate dither matrixes for executing halftone processing.

FIGS. 7A to 7C illustrate binary image data after halftone processing and laser spots by a plurality of light-emitting sources.

FIG. 8 illustrates a combination of a dither matrix and a light-emitting source.

FIG. 11 illustrates a dither matrix for executing halftone processing.

FIGS. 13A to 13C illustrate scanning lines drawn by four laser light-emitting sources.

FIGS. 14A to 14D illustrate binary image data after halftone processing and laser spots by a plurality of light-emitting sources.

DESCRIPTION OF THE EMBODIMENTS

Various exemplary embodiments, features, and aspects of the invention will be described in detail below with reference to the drawings.

Figure 1:
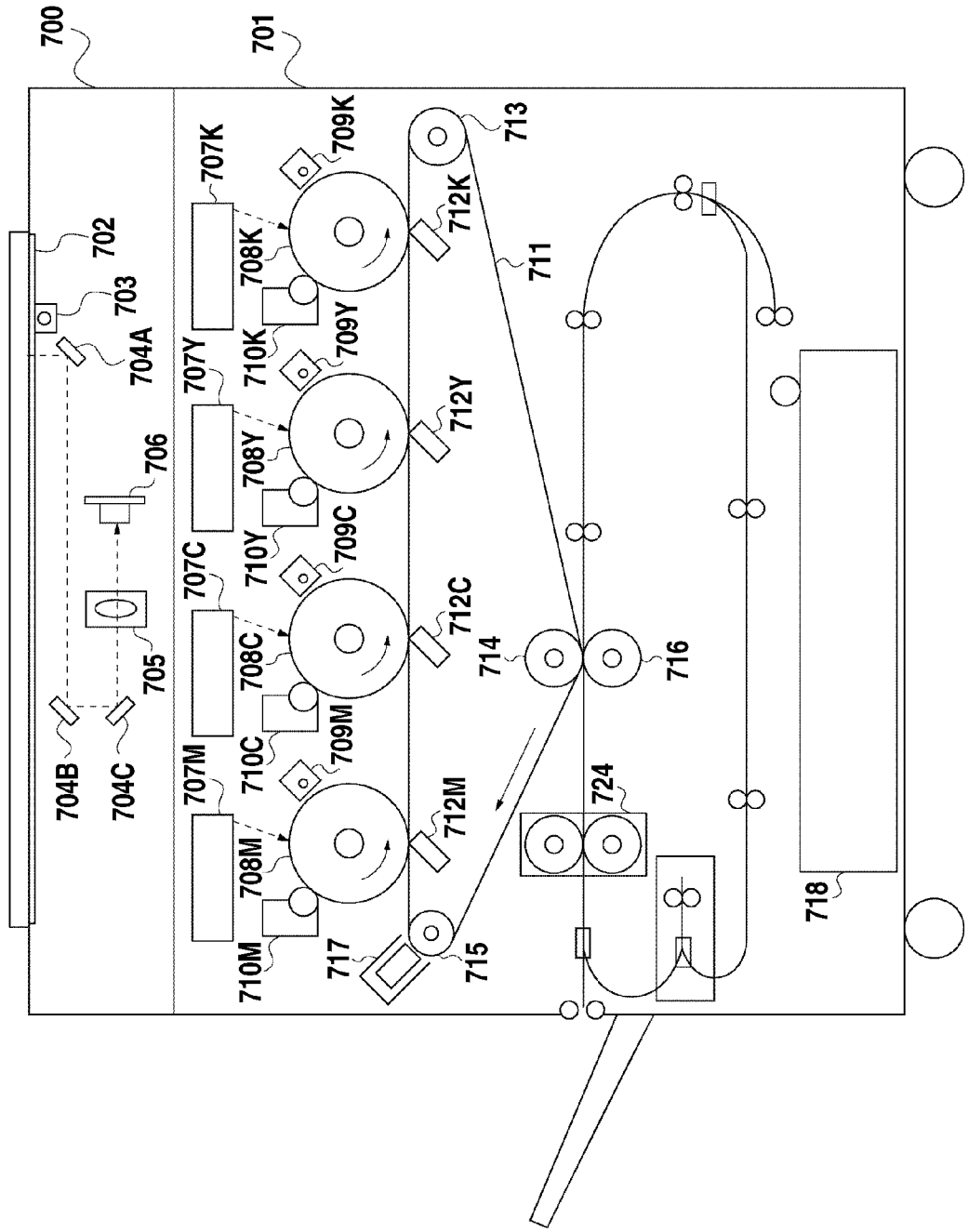
FIG. 1 is a cross sectional view illustrating an image forming apparatus according to an exemplary embodiment of the present invention.

FIG. 1 is a cross sectional view illustrating an image forming apparatus according to a first exemplary embodiment of the present invention. A document scanner 700 forms an image placed on a platen glass 702 on a color image sensor 706 via an illumination lamp 703, mirrors 704A, 704B, and 704C, and a lens 705; reads a color image on a document for each of color components of blue (B), green (G), and red (R); and converts the image into an electrical image signal. Then, color conversion processing is executed on the image signal of B, G, and R obtained by the document scanner 700 to obtain color image data of black (K), cyan (C), magenta (M), and yellow (Y). Further, data input from the outside such as a telephone line and a network can be transmitted and received via an external interface other than the document scanner 700. When the received data is in page description language (PDL), a PDL processing unit can rasterize the data into image information to obtain color image data.

In a printer 701, a laser scanner 707 emits laser light corresponding to color image data from the document scanner 700 to form an electrostatic latent image corresponding to a document image on a photosensitive member 708, which is rotated and driven in a sub scanning direction (M, C, Y, and K affixed to reference numerals of various components indicate color to be subjected to image formation). Around the photosensitive member 708, a charging device 709, a developing device 710, an intermediate transfer belt 711, and a first transfer bias blade 712 are mounted. The intermediate transfer belt 711 is tensioned around a driving roller 713 and driven rollers 714 and 715. Further, a second transfer bias roller 716 is disposed in a position opposite to the driven roller 714 of the intermediate transfer belt 711. Furthermore, in a predetermined position opposite to the driven roller 715 on the outer surface of the intermediate transfer belt 711, a belt cleaning unit 717 is mounted. The electrostatic latent image on the photosensitive member 708 is developed by the developing device 710. The developed toner image on the photosensitive member 708 is transferred onto the intermediate transfer belt 711 by the first transfer bias blade 712. The toner image transferred on the intermediate transfer belt 711 is transferred by the second transfer bias roller 716 onto recording paper (recording sheet) fed from a cassette 718. The toner image on the recording paper is subjected to fixing processing by a fixing device 724.

Figure 2A:
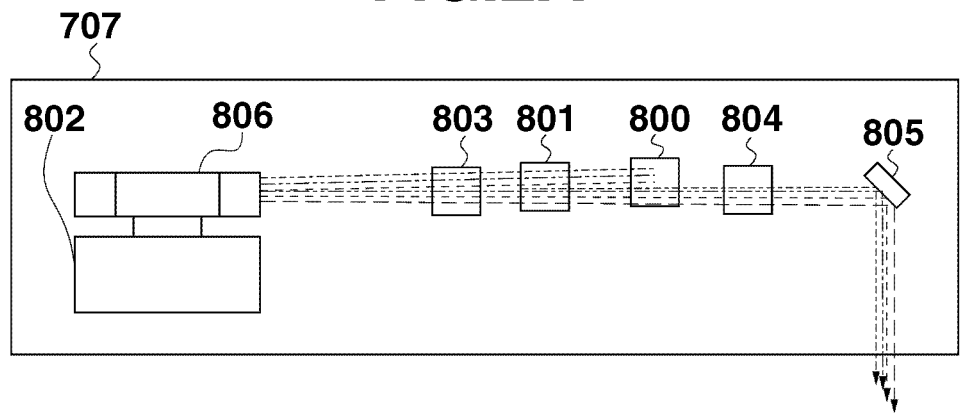
FIGS. 2A and 2B are cross sectional views illustrating a laser scanner.
Figure 2B:
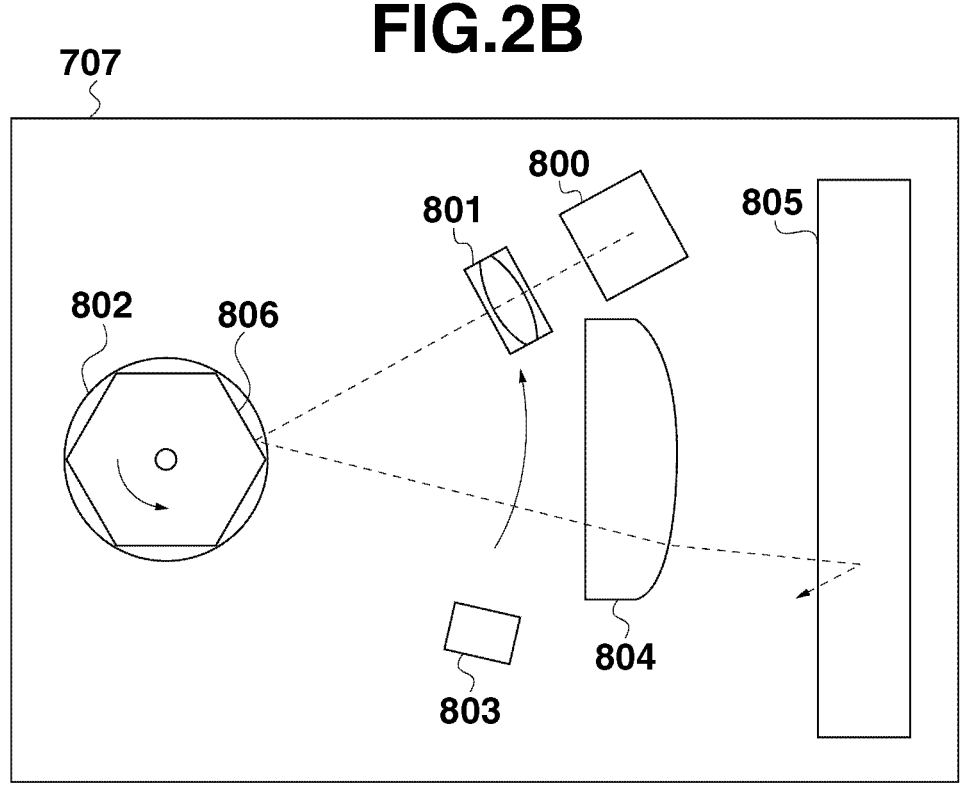

FIG. 2A is a side cross sectional view illustrating the laser scanner 707. FIG. 2B is a top cross sectional view illustrating the laser scanner 707. A light-emitting element group 800 includes four light-emitting sources (light-emitting sources 1, 2, 3, and 4 starting from the top in the sub scanning direction in order), which emit laser light corresponding to pixel data. The light-emitting element group 800 simultaneously executes emission of laser light for four lines by the light-emitting sources 1, 2, 3, and 4. The optical paths of laser light emitted from the light-emitting sources 1, 2, 3, and 4 are expressed by the dashed-dotted line, dashed-two dotted line, dotted line, and broken line, respectively. Four laser light beams emitted from the light-emitting element group 800 are arranged in the sub scanning direction of the photosensitive member 708 and irradiated to the photosensitive member 708 via an optical system (lens 801, polygonal mirror 806, fθ lens 804, and planar mirror 805). The polygonal mirror 806, having six reflection surfaces on the side, is rotated and driven by a polygon motor 802. When the polygonal mirror 806 rotates one revolution, the polygonal mirror 806 executes deflection scanning of laser light of the light-emitting element group 800 six times in the main scanning direction. When a detection element 803 detects deflected laser light by the polygonal mirror 806, the detection element 803 outputs a beam detection (BD) signal, which is used to trigger start of exposure for each main scanning.

Figure 3:
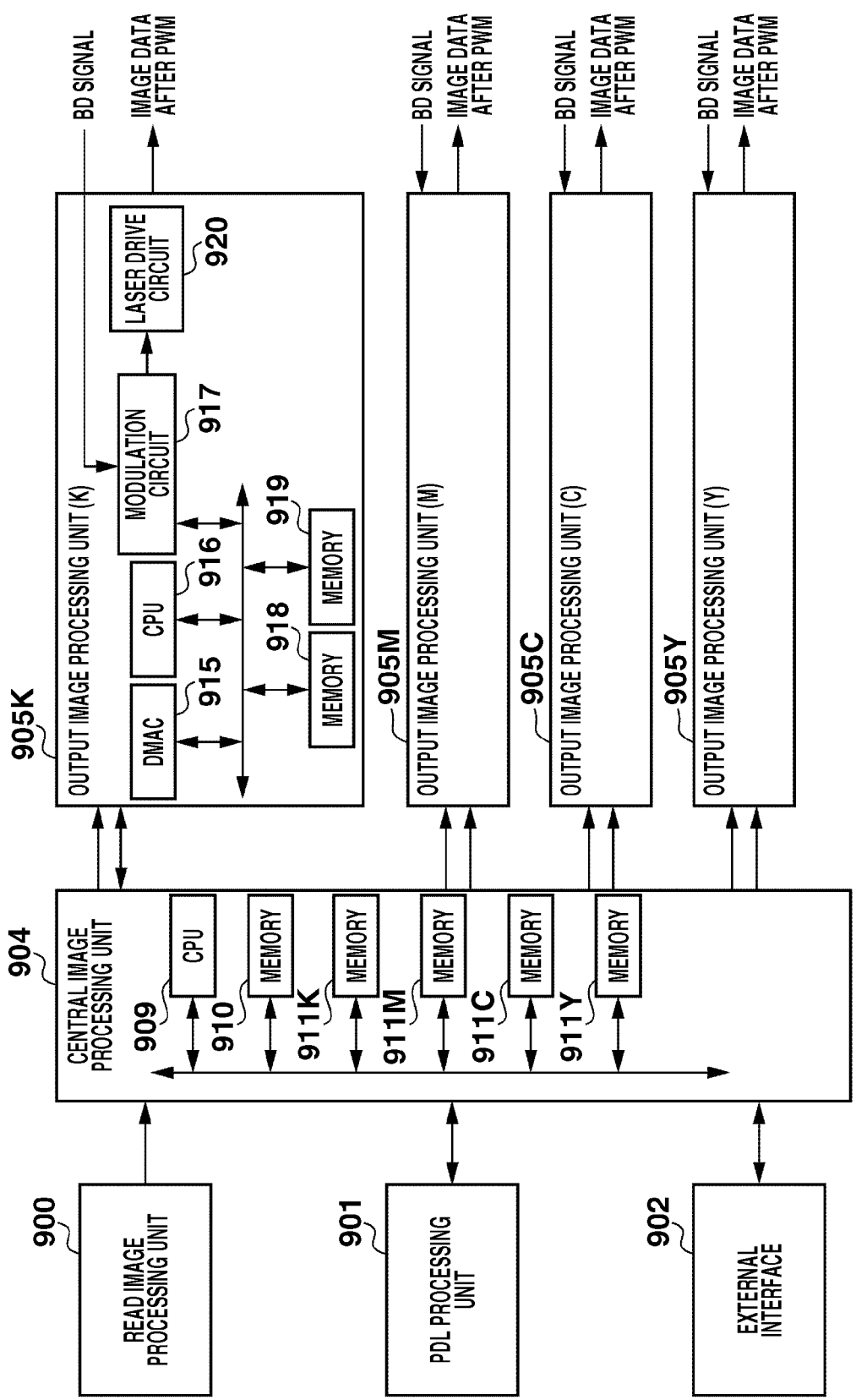
FIG. 3 is a block diagram illustrating an image processing unit according to an exemplary embodiment of the present invention.

FIG. 3 is a block diagram illustrating an image processing unit configured to process image data output from the document scanner 700 in FIG. 1 to output the processed image data to the laser scanner 707 in FIGS. 1, 2A, and 2B. An image signal read by the document scanner 700 is subjected to image processing such as shading correction that depends on a reading device by a read image processing unit 900 and transmitted to a central image processing unit 904. The central image processing unit 904 has a central processing unit (CPU) 909 and executes image processing, which will be described below. In an image memory 911, image data on each color of Y, M, C, and K is stored. The central image processing unit 904 transmits and receives image data to and from a telephone line or a network via an external interface 902. When the received data is in PDL, a PDL processing unit 901 rasterizes the PDL data into image data.

An output image processing unit 905 executes processing of image data on respective Y, M, C, and K. A direct memory access controller (DMAC) 915 receives image data from the image memory 911 and stores it in a memory 918. A CPU 916 processes image data stored in the memory 918. A modulation circuit 917 executes pulse width modulation (PWM) on the stored image data in synchronization with the BD signal, and transmits a pulse signal subjected to the PWM to a laser drive circuit 920. The laser drive circuit 920 drives a laser light-emitting source according to the pulse signal to emit laser light.

FIG. 4 is a flowchart illustrating image processing to be executed by the CPU 909 in the central image processing unit 904. In step S1001, the CPU 909 executes color conversion of R, G, and B (RGB) image data for each pixel into Y, M, C, and K (YMCK) image data. Each pixel of the YMCK image data to be obtained by the color conversion processing is multilevel data of 4 bits (16 gradations). Thereafter, processing is independently executed on image data of respective Y, M, C, and K. Next, in step S1002, the CPU 909 executes halftone processing to convert a multilevel image of YMCK generated by the color conversion processing into halftone dot data using a two-dimensional image processing filter. Specifically, the image processing filter is a dither matrix having a threshold value for each pixel. The CPU 909 compares the multilevel image data with the dither matrix to convert the multilevel image data into pixel data constituting a screen pattern (halftone dot image) that expresses the density with a plurality of pixels. The halftone processing will be described in detail below.

Figure 5A:
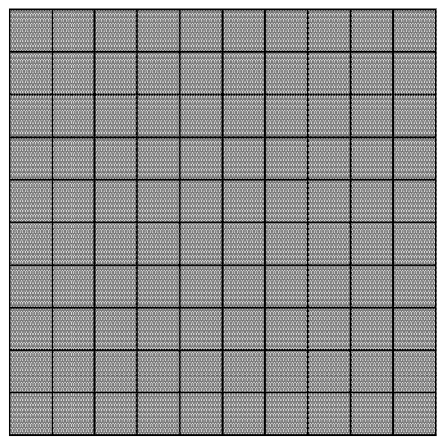
FIGS. 5A and 5B illustrate multilevel image data after color conversion processing and binary image data after halftone processing, respectively.
Figure 5B:
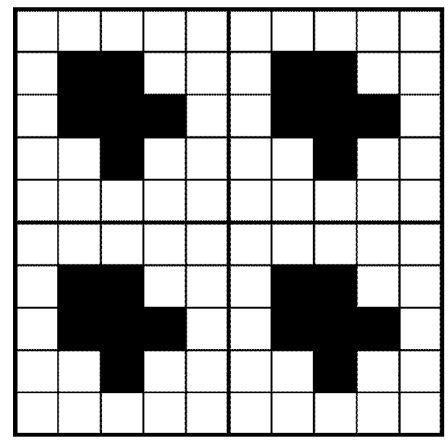

FIG. 5A illustrates an example of multilevel image data of K (black) obtained by the color conversion processing. In the halftone processing, binarization processing of multilevel data is executed. An electrophotographic image forming apparatus is configured to express an image having an intermediate density with the number of pixels on which toner is applied within every image area composed of a plurality of pixels. This is an expression method that is referred to as pulse-surface-area modulation. In the present exemplary embodiment, the pulse-surface-area modulation is realized using a dither matrix illustrated in FIG. 6A. In the dither matrix, a threshold value is set to each pixel within the matrix such that the larger the value of multilevel data becomes, the more the number of pixels on which toner is applied is increased, illustrated in FIG. 6A. Data in which a number of such dither matrixes corresponding to an image size are arranged lattice-like as illustrated in FIG. 6B is stored in a dither matrix memory 910 in advance. The CPU 909 superposes the dither matrix in the dither matrix memory 910 on multilevel image data after color conversion processing to compare the pixel value of the input image and the threshold value of the dither matrix for each pixel. Then, if the multilevel image data is larger than the threshold value, the CPU 909 outputs a value "1", which indicates applying toner on the pixel of the dither matrix. If the multilevel image data is smaller than the threshold value, the CPU 909 outputs a value "0", which indicates "not applying toner on the pixel of the dither matrix". Then, the CPU 909 stores this binary data in the image memory 911. In this way, the CPU 909 binarizes a halftone multilevel image as illustrated in FIG. 5A into a binary halftone dot image subjected to screen processing as illustrated in FIG. 5B.

The number of pixels M of the dither matrix in the sub scanning direction for use in the present exemplary embodiment is the number of pixels in which a remainder R is not 0 when the number of pixels M is divided by the number of light-emitting sources B of the light-emitting element group 800 (the number M is not divisible by the number B). In other words, the number of pixels M of a screen pattern in the sub scanning direction that expresses the density with a plurality of pixels is the number of pixels in which a remainder R is not 0 when the number of pixels M is divided by the number of light-emitting sources B of the light-emitting element group 800 (the number M is not divisible by the number B). More particularly, the number M and the number B have a relationship such that the number of pixels M is not divisible by the number of light-emitting sources B. In other words, the number M and the number B have a relationship such that the number of pixels M is not an integral multiple of the number of light-emitting sources B. For example, in the present exemplary embodiment, the number of light-emitting sources is four. Thus, the number of pixels of the dither matrix in the sub scanning direction is five. A remainder obtained by dividing five (number of pixels in the sub scanning direction) by four (number of light-emitting sources) is 1≠0. If the number of pixels of the dither matrix in the sub scanning direction is the number of pixels that is not divisible by the number of light-emitting sources of the light-emitting element group 800, the number of pixels may be another number. Further, if the number of light-emitting sources B of the light-emitting element group 800 is larger than the number of pixels M of the dither matrix in the sub scanning direction, the number of pixels of the dither matrix may be any number such that a remainder is not 0 when the number of light-emitting sources B is divided by the number of pixels M of the dither matrix in the sub scanning direction (the number of light-emitting sources B is not divisible by the number of pixels M of the dither matrix in the sub scanning direction). In other words, a relationship is such that the number of light-emitting sources B is not an integral multiple of the number of pixels M of the dither matrix in the sub scanning direction. The number of pixels of the dither matrix in the main scanning direction may be any number of pixels as long as halftone processing can be performed.

Thus, binarization is executed with the dither matrix. Hence, in image data periodical in the sub scanning direction as illustrated in FIG. 7A, at the end part of main scanning, a halftone dot image is formed as illustrated in FIG. 7B and at the center part of main scanning, a halftone dot image is formed as illustrated in FIG. 7C. At the center part of main scanning, as illustrated in FIG. 7C, the size of halftone dot is periodically changed in the sub scanning direction. Thus, the center part of main scanning can be prevented from having a thin density or a tick density compared with the end part of main scanning. This is because, with respect to the dither matrix, the light-emitting sources become out of alignment by a remainder in the sub scanning direction. In the present exemplary embodiment, a combination of the dither matrix and the light-emitting source includes four patterns as illustrated in FIG. 8. In pattern 1, lasers 1, 2, 3, 4, and 1 correspond to five lines of the dither matrix in the sub scanning direction, respectively, in pattern 2, lasers 2, 3, 4, 1, and 2 correspond thereto, in pattern 3, lasers 3, 4, 1, 2, and 3 correspond thereto, and in pattern 4, lasers 4, 1, 2, 3, and 4 correspond thereto. Exposure is executed in all of patterns 1 to 4. Thus, it can be avoided that the line of the dither matrix and the light-emitting source correspond each other with these fixed. A line pitch larger than an ideal pitch can be offset by a line pitch smaller than the ideal pitch. Thus, the total of lengths of four halftone dots in the sub scanning direction is equal to the total of lengths of four ideal halftone dots. More specifically, halftone dots are repeated in the number of lines of the least common multiple (20 lines in the present exemplary embodiment) between the number of light-emitting sources and the number of sub scanning pixels of the dither matrix. In view of the total of the number of lines of the least common multiple, an area similar to the case of the ideal pitch is exposed. Accordingly, macroscopically, a difference in density between the end part and the center part of the halftone image in the main scanning direction can be eliminated. Therefore, even if a pitch between actual scanning lines fluctuates in the main scanning position, a uniform screen image can be formed inside the entire page.

Figure 9:
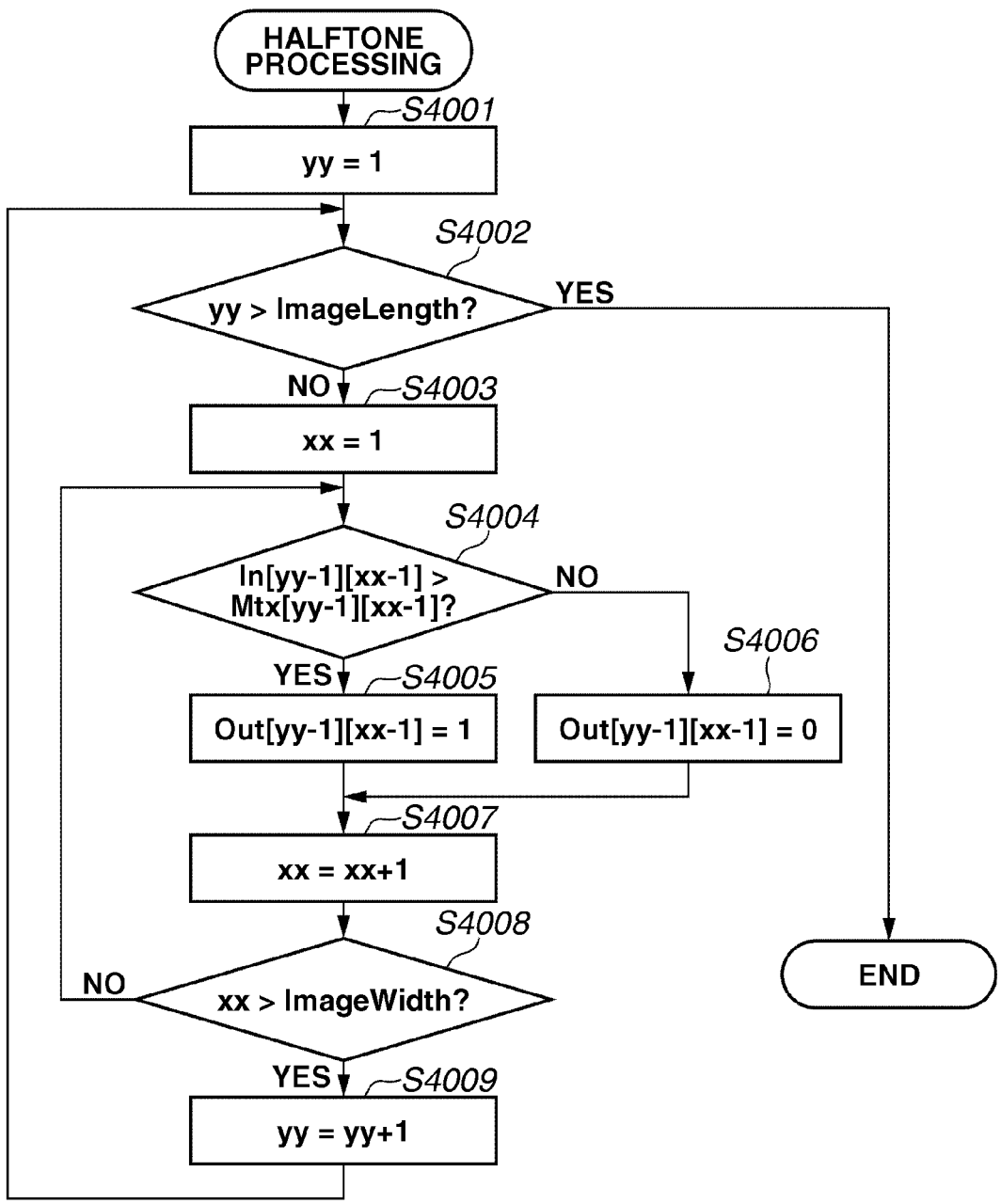
FIG. 9 is a flowchart illustrating halftone processing according to an exemplary embodiment of the present invention.

FIG. 9 is flowchart illustrating halftone processing in step S1002 illustrated in FIG. 4. Input image data of K (black) stored in the image memory 911 is stored as two-dimensional arrangement, which is denoted by In [Y] [X] where a pixel position in the main scanning direction is X and a pixel position in the sub scanning direction is Y. Further, output image data is also stored in the image memory 911 as two-dimensional arrangement, which is denoted by Out [Y] [X]. Furthermore, dither matrix data spreading the dither matrix by an image size is stored in the dither matrix memory 910 as two-dimensional arrangement, which is denoted by Mtx [Y] [X]. In the positions Y and X, a pixel at the upper left corner of an image is set to the origin coordinates, which are denoted by (0,0). More specifically, a pixel at the upper left corner of an image is denoted by In [0] [0].

First, in step S4001, the CPU 909 initializes a sub scanning count variable yy, which is used to count the number of pixels in the sub scanning direction, to 1. In step S4002, the CPU 909 determines whether the sub scanning count variable yy exceeds the number of pixels ImageLength of an input image in the sub scanning direction. If the sub scanning count variable yy exceeds the number of pixels ImageLength (YES in step S4002), the CPU 909 ends the halftone processing. If the sub scanning count variable yy is equal to or smaller than the number of pixels ImageLength in the sub scanning direction (NO in step S4002), then in step S4003, the CPU 909 initializes a main scanning count variable xx, which is used to count the number of pixels of main scanning, to 1. Then, in step S4004, with respect to a pixel indicated by the sub scanning count variable yy and the main scanning count variable xx, the CPU 909 compares the input image data and the dither matrix data. If the input image data is larger than the dither matrix data, then in step S4005, the CPU 909 sets the output image data to 1. With respect to a pixel indicated by the sub scanning count variable yy and the main scanning count variable xx, if the input image data is equal to or smaller than the dither matrix data (NO in step S4004), then in step S4006, the CPU 909 set the output image data to 0. After steps S4005 and S4006, in step S4007, the CPU 909 adds 1 to (increments) the main scanning count variable xx. Then, in step S4008, the CPU 909 determines whether the main scanning count variable xx exceeds the number of pixels ImageWidth of an input image in the main scanning direction. If the main scanning count variable xx is equal to or smaller than the number of pixels ImageWidth (NO in step S4008), the processing returns to step S4004. If the main scanning count variable xx exceeds the number of pixels ImageWidth (YES in step S4008), the CPU 909 adds 1 to (increments) the sub scanning count variable yy, and then the processing returns to step S4002. Thus, the whole one page of image data is compared with the dither matrix, thereby converting the image data into a binary halftone dot image. In the present exemplary embodiment, the image data is converted into binary pixel data by dither processing. However, the image data may be converted into multilevel pixel data by dither processing. In this case, by PWM control corresponding to multilevel data, a light-emitting time of the light-emitting source for each pixel is controlled. Further, in the present exemplary embodiment, the pulse-surface-area modulation control is executed by the dither method. However, the image data may also be converted into pixel data by a density pattern method, which selects a screen pattern that expresses a density with a plurality of pixels corresponding to the density of the image data. In this case, the number of pixels M of a screen pattern in the sub scanning direction is the number of pixels in which a remainder R is not 0 when the number of pixels is divided by the number of light-emitting sources B of the light-emitting element group 800 (the number M is not divisible by the number B).

Figure 10:
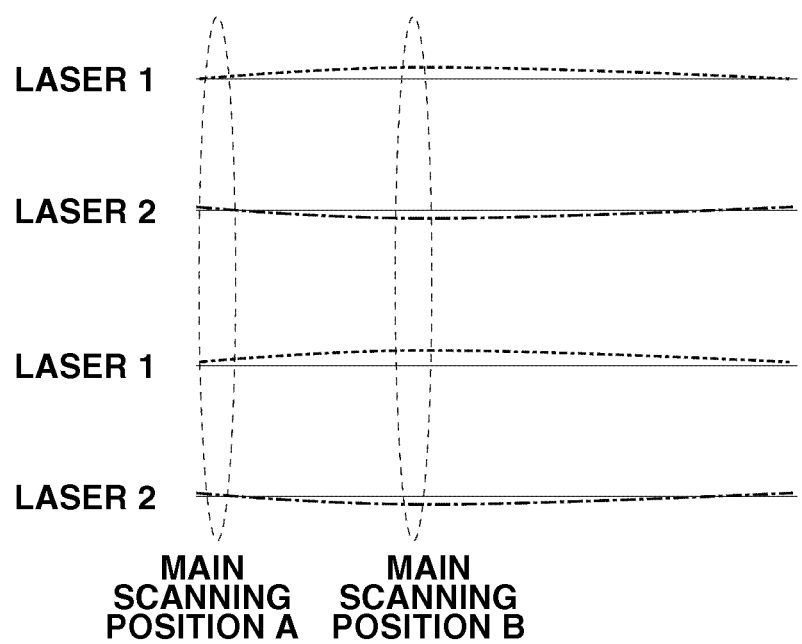
FIG. 10 illustrates scanning lines drawn by two laser light-emitting sources.
Figure 12A:
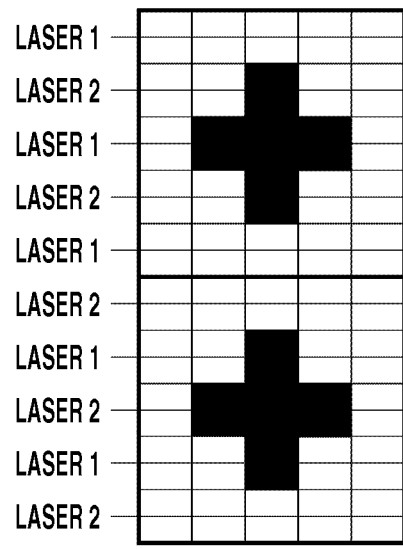
FIGS. 12A to 12C illustrate binary image data after halftone processing and laser spots by a plurality of light-emitting sources.
Figure 12B:
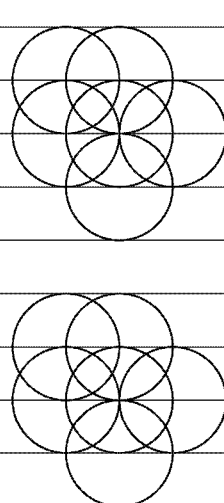
Figure 12C:
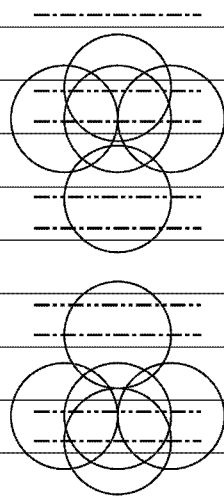
Figure 15A:
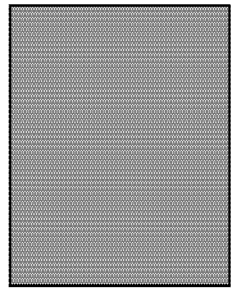
FIGS. 15A to 15C illustrate the density of an entire image on one page.
Figure 15B:
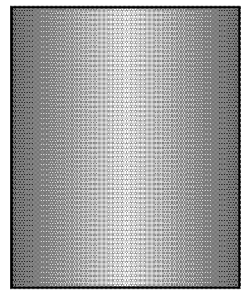
Figure 15C:
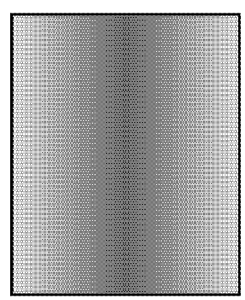

In the first exemplary embodiment, a case in which the number of light-emitting sources of the light-emitting element group 800 is four and the number of pixels of the dither matrix in the sub scanning direction is five has been described. However, the present invention is not limited to this. In a second exemplary embodiment of the present invention, a case in which the number of light-emitting sources of the light-emitting element group 800 is two and the number of pixels of the dither matrix in the sub scanning direction is five will be described. When the number of light-emitting sources of the light-emitting element group 800 is two, the pitches of scanning lines are only two in number, i.e., the pitch between scanning lines by laser 1 and laser 2 and the pitch between scanning lines by laser 2 and laser 1 of next main scanning. When one pitch is narrowed, the other pitch is widened. FIG. 10 illustrates scanning lines by lasers when scanning lines for two lines are simultaneously drawn by two laser light-emitting sources. The solid line indicates an ideal scanning line, the dashed-dotted line indicates a scanning line by laser 1, and the dashed-two dotted line is a scanning line by laser 2. As illustrated in FIG. 10, when the scanning line by laser 1 is curved convex upward and the scanning line by laser 2 is curved convex downward, a pitch between scanning lines by laser 1 and laser 2 is made larger than the ideal. Thus, a pitch between scanning lines by laser 2 and laser 1 of next scanning is made smaller. In the second exemplary embodiment, as illustrated in FIG. 11, the number of pixels of the dither matrix in the sub scanning direction is an odd number and the threshold values of the dither matrix are line symmetry relative to the center in the sub scanning direction. Thus, in image data periodical in the sub scanning direction as illustrated in FIG. 12A, at the end part of main scanning, a halftone dot image is formed as illustrated in FIG. 12B and at the center part of main scanning, a halftone dot image is formed as illustrated in FIG. 12C. At the center part of main scanning, as illustrated in FIG. 12C, a portion where a pitch between scanning lines by laser 2 and laser 1 of next scanning becomes smaller is offset by a portion where a pitch between scanning lines by laser 1 and laser 2 becomes larger. Thus, a halftone dot at the center part of main scanning can be prevented from being excessively decreased or increased compared with that at the end part of main scanning. Accordingly, it can be suppressed that the center part of main scanning has a thin density or a thick density compared with the end part of main scanning.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-265235 filed Nov. 20, 2009, which is hereby incorporated by reference herein in its entirety.

What is claimed is:

1. An apparatus comprising:
a photosensitive member on which a latent image is formed;
a plurality of light-emitting sources configured to irradiate different positions on the photosensitive member in a sub scanning direction in which the photosensitive member is rotated, the photosensitive member being scanned with light beams emitted from the light emitting sources in a main scanning direction;
a developing unit configured to develop the latent image formed on the photosensitive member using a toner;
a processing unit configured to perform halftone processing on image data using a dither matrix; and
a drive unit configured to cause the plurality of light-emitting sources to emit light based on the processed image data,
wherein, where a number of light-emitting sources is B and a number of pixels of the dither matrix in the sub scanning direction is M, the number M is not divisible by the number B, the number M is an odd number
wherein threshold values of the dither matrix is line symmetric relative to a center in the sub scanning direction, and
wherein the processing unit compares a value of a target pixel with one of the threshold values of the dither matrix, the one of the threshold values being selected from the threshold values based on a position of the target pixel in the main scanning direction and a position of the target pixel in the sub scanning direction.

2. The apparatus according to claim 1, wherein the number M is larger than the number B.

3. The apparatus according to claim 1, wherein the processed image data is binary pixel data.

4. The apparatus according to claim 1, wherein the processed image data is multilevel pixel data.

5. An apparatus comprising:
a photosensitive member on which a latent image is formed;
a plurality of light-emitting sources configured to irradiate different positions on the photosensitive member in a sub scanning direction in which the photosensitive member is rotated, the photosensitive member being scanned with light beams emitted from the light emitting sources in a main scanning direction;
a developing unit configured to develop the latent image formed on the photosensitive member using a toner;
a processing unit configured to perform halftone processing on image data using a dither matrix; and
a drive unit configured to cause the plurality of light-emitting sources to emit light based on the processed image data,
wherein, where a number of light-emitting sources is B and a number of pixels of the dither matrix in the sub scanning direction is M, the number B is not divisible by the number M, the number M is an odd number
wherein threshold values of the dither matrix is line symmetric relative to a center in the sub scanning direction, and
wherein the processing unit compares a value of a target pixel with one of the threshold values of the dither matrix, the one of the threshold values being selected from the threshold values based on a position of the target pixel in the main scanning direction and a position of the target pixel in the sub scanning direction.

6. The apparatus according to claim 5, wherein the number M is smaller than the number B.

7. The apparatus according to claim 5, wherein the processed image data is binary pixel data.

8. The apparatus according to claim 5, wherein the processed image data is multilevel pixel data.

* * * * *